United States Patent
Song et al.

(10) Patent No.: US 12,391,776 B2
(45) Date of Patent: Aug. 19, 2025

(54) METHOD FOR PRODUCING ETHYLENE-CARBOXYLIC ACID COPOLYMER

(71) Applicants: SK Innovation Co., Ltd., Seoul (KR); SK Geo Centric Co., Ltd., Seoul (KR)

(72) Inventors: In Hyoup Song, Daejeon (KR); Hong Chan Kim, Daejeon (KR); Jang Hoon Ock, Daejeon (KR); Jung A Lee, Daejeon (KR); Wan Ju Jeong, Daejeon (KR)

(73) Assignees: SK Innovation Co., Ltd.; SK Geo Centric Co., Ltd., Seoul (KR)

(*) Notice: Subject to any disclaimer, the term of this patent is extended or adjusted under 35 U.S.C. 154(b) by 1047 days.

(21) Appl. No.: 17/427,131

(22) PCT Filed: Jan. 29, 2020

(86) PCT No.: PCT/KR2020/001308
§ 371 (c)(1),
(2) Date: Apr. 8, 2022

(87) PCT Pub. No.: WO2020/159204
PCT Pub. Date: Aug. 6, 2020

(65) Prior Publication Data
US 2022/0242980 A1    Aug. 4, 2022

(30) Foreign Application Priority Data

Feb. 1, 2019  (KR) .................. 10-2019-0013255
Jan. 17, 2020  (KR) .................. 10-2020-0006278

(51) Int. Cl.
*C08F 210/02*  (2006.01)
*C08F 2/01*  (2006.01)
(Continued)

(52) U.S. Cl.
CPC .............. *C08F 210/02* (2013.01); *C08F 2/01* (2013.01); *C08F 2/38* (2013.01); *C08F 220/06* (2013.01)

(58) Field of Classification Search
USPC ....................................... 526/318.6
See application file for complete search history.

(56) References Cited

U.S. PATENT DOCUMENTS 2,897,183 A    7/1959  Christl et al.
3,379,702 A *  4/1968  Spivey .................. C08F 220/06
                                                  526/240
(Continued)

FOREIGN PATENT DOCUMENTS

EP    1348723 A2    10/2003
KR    100147371 B1    8/1998
(Continued)

OTHER PUBLICATIONS

Fried, "The Synthesis of High Polymers", Jan. 2003, Polymer Science and Technology, pp. 34-39, Prentice Hall PTR.
(Continued)

*Primary Examiner* — Fred M Teskin
(74) *Attorney, Agent, or Firm* — The Webb Law Firm

(57) ABSTRACT

In a method of producing an ethylene-carboxylic acid copolymer according to an embodiment of the present invention, a carboxylic acid monomer and a polar co-solvent are introduced separately into a mixing unit or stored together in a supply unit to form a mixture. The mixture and ethylene are injected into a reactor to be copolymerized. Reaction kinetic properties of the carboxylic acid monomer and the polar co-solvent are controlled to suppress a formation of by-products.

15 Claims, 6 Drawing Sheets

(51) Int. Cl.
*C08F 2/38* (2006.01)
*C08F 220/06* (2006.01)

(56) References Cited

U.S. PATENT DOCUMENTS

| | | | |
|---|---|---|---|
| 4,351,931 A * | 9/1982 | Armitage | C08F 220/06 |
| | | | 526/219.1 |
| 5,028,674 A | 7/1991 | Hatch et al. | |
| 5,384,373 A | 1/1995 | McKinney et al. | |
| 6,245,864 B1 | 6/2001 | Hasenbein et al. | |
| 6,852,792 B1 | 2/2005 | Capendale et al. | |
| 8,871,876 B2 | 10/2014 | Berbee et al. | |
| 10,457,757 B2 | 10/2019 | Eddy et al. | |
| 2007/0037924 A1 | 2/2007 | Talkowski | |
| 2013/0333832 A1 | 12/2013 | Vittorias et al. | |
| 2015/0299357 A1 | 10/2015 | Berbee et al. | |

FOREIGN PATENT DOCUMENTS

| | | |
|---|---|---|
| KR | 1020130098382 A | 9/2013 |
| KR | 1020140044781 A | 4/2014 |
| KR | 1020150099761 A | 9/2015 |
| KR | 102018022822 A | 3/2018 |
| WO | 20120044503 A1 | 4/2012 |

OTHER PUBLICATIONS

Kricheldorf, et al., "Handbook of Polymer Synthesis", 2005, pp. 1-946, Second Edition, Marcell Dekker.

Williams, "Instantaneous Number-Average Degree of Polymerization", Jan. 1971, Polymer Science and Engineering, pp. 103-104, Sec. 410, Prentice Hall.

* cited by examiner

METHOD FOR PRODUCING ETHYLENE-CARBOXYLIC ACID COPOLYMER

CROSS-REFERENCE TO RELATED APPLICATIONS

This application is the United States National Phase of International Application No. PCT/KR2020/001308 filed Jan. 29, 2020, and claims priority to Korean Patent Applications No. 10-2019-0013255 filed Feb. 1, 2019 and No. 10-2020-0006278 filed January 17, 2020, the disclosures of which are hereby incorporated by reference in their entirety.

BACKGROUND OF THE INVENTION

Field of the Invention

The present invention relates to a method of producing an ethylene-carboxylic acid copolymer.

Description of Related Art

For example, an ethylene-carboxylic acid copolymer such as an ethylene-acrylic acid copolymer is used for various products such as a sealing material, an adhesive, a packing material, an optical film, etc.

The ethylene-carboxylic acid copolymer may be prepared by polymerizing ethylene and a carboxylic acid-based compound (e.g., acrylic acid, methacrylic acid, etc.) as a comonomer through a continuous reactor.

The carboxylic acid-based compound has higher self-reactivity than that of ethylene, and thus may be self-polymerized when exposed to a high temperature while being supplied through a flow path, a pump, a compressor, or the like. In this case, clogging of the flow path, etc., may be caused to damage a polymerization equipment. When a operation temperature of the equipment is lowered in order to prevent the self-polymerization, a crystallization of the carboxylic acid-based compound may occur.

A co-solvent may be used together to prevent the crystallization and suppress fouling in the equipment when supplying the carboxylic acid-based compound. However, when a polar solvent is used as the co-solvent, the polar solvent may react with the carboxylic acid-based compound to form by-products.

Further, for example, when a continuous process is performed under severe polymerization conditions of high temperature and high pressure, detailed component analysis and reaction analysis of the by-products in the flow path may not be substantially possible.

Therefore, control of the polymerization process and process parameters that may suppress the additional by-products while preventing the self-polymerization of the carboxylic acid-based compound is required.

For example, U.S. Registered Patent Publication No. 6,852,792 discloses an aqueous dispersion for sealing which includes an ethylene-acrylic acid copolymer, but does not recognize the requirements of the polymerization process design as described above.

SUMMARY OF THE INVENTION

Technical Objective

According to an aspect of the present invention, there is provided a method of producing an ethylene-carboxylic acid copolymer having improved process reliability and polymerization efficiency.

Technical Means

In a method of producing an ethylene-carboxylic acid copolymer, a mixture of a carboxylic acid monomer and a polar co-solvent that is an organic solvent is formed. The mixture and ethylene are injected into a reactor to copolymerize the mixture and ethylene. In the forming the mixture of the carboxylic acid monomer and the polar co-solvent, a Reaction Progress Index (RPI) defined by Equation 1 is adjusted in a range from 1.5 to $1.3 \times 10^7$ sec·K to control an amount of a side reaction product of the carboxylic acid monomer and the polar co-solvent:

$$RPI = \frac{C_{solvent}}{C_{monomer}} tT \quad \text{[Equation 1]}$$

In Equation 1, $C_{solvent}$ and $C_{monomer}$ are initial molar concentrations of the carboxylic acid monomer and the polar co-solvent, respectively, t represents a contact time of the carboxylic acid monomer and the polar co-solvent, and T represents an average contact temperature of the carboxylic acid monomer and the polar co-solvent before being reacted with ethylene.

In some embodiments, the reaction progress index may be in a range from 14.9 to $1.3 \times 10^5$ sec·K.

In some embodiments, discharging the mixture may be further performed.

In some embodiments, a discharge pressure of the mixture may be greater than a mixing pressure of the carboxylic acid monomer and the polar co-solvent.

In some embodiments, the discharge pressure may be greater than a pressure in the reactor.

In some embodiments, in the forming the mixture, each of the carboxylic acid monomer and the polar co-solvent may be introduced into a mixing unit. In the discharging the mixture, the mixture from the mixing unit may be transferred to a discharge unit through a conveying flow path. The mixture may be discharged from the discharge unit through a discharge flow path.

In some embodiments, a temperature of the mixture may be maintained to be greater than a crystallization temperature of the carboxylic acid monomer and less than a self-polymerization temperature of the carboxylic acid monomer.

In some embodiments, the mixture may be in contact with ethylene before being injected into the reactor.

In some embodiments, a reaction inhibitor between the carboxylic acid monomer and the polar co-solvent may be injected into the mixture.

In some embodiments, the reaction inhibitor may include an amine-based compound.

In some embodiments, a chain transfer agent may be further injected into the mixture through a front-end flow path of the reactor.

In some embodiments, the chain transfer agent may include a non-polar organic compound.

In some embodiments, the chain transfer agent may include methyl ethyl ketone or isobutane.

In some embodiments, Equation 2 may be satisfied:

$$0.003 \text{ mol/L} \leq Cs_{solvent}C_{solvent}^r + Cs_{CTA}C_{CTA}^r \leq 0.01 \text{ mol/L} \quad \text{[Equation 2]}$$

$C_{solvent}^r$ and $C_{TA}^r$ are each molar ratio of the polar co-solvent and the chain transfer agent (CTA), respectively, at the front-end flow path of the reactor, and $Cs_{solvent}$ and $Cs_{CTA}$ are each chain transfer coefficient (Cs) of the polar co-solvent and the chain transfer agent, respectively, with respect to ethylene at 200° C.

In some embodiments, the carboxylic acid monomer may include acrylic acid and the polar co-solvent includes ethanol.

Effects of the Invention

In the method for producing an ethylene-carboxylic acid copolymer according to exemplary embodiments, a polar co-solvent may be used as a carrier fluid of a carboxylic acid monomer. A crystallization temperature of a mixture of the polar co-solvent and the carboxylic acid monomer may be lower than a crystallization temperature of a pure carboxylic acid monomer. Accordingly, a decrease in process yield or process efficiency due to a crystallization or a self-polymerization may be prevented.

In exemplary embodiments, parameters of the carboxylic acid monomer and the polar co-solvent may be adjusted so that a side reaction between the carboxylic acid monomer and the polar co-solvent may be suppressed while appropriately controlling a reaction performance. Therefore, deterioration of physical properties of a polymer product may be prevented by suppressing the side reaction products generated from the carboxylic acid monomer, and residual side reaction products in the product may also be prevented. Additionally, a copolymerization yield, a conversion rate, and a molecular weight and a molecular weight distribution of the product may be appropriately controlled.

In exemplary embodiments, the side reaction products may be effectively suppressed by the control of process conditions without reducing a process efficiency and without an installation of a separate analyzing apparatus for detecting the side reaction products in a high-temperature and high-pressure flow path.

BRIEF DESCRIPTIONS OF DRAWINGS

DESCRIPTION OF THE INVENTION

According to exemplary embodiments of the present invention, there is provided a method of producing an ethylene-carboxylic acid copolymer in which a carboxylic acid monomer is supplied together with a polar co-solvent to induce copolymerization with ethylene while suppressing side reactions caused by the polar co-solvent Hereinafter, the present invention will be described in detail with reference to the accompanying experimental examples and drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
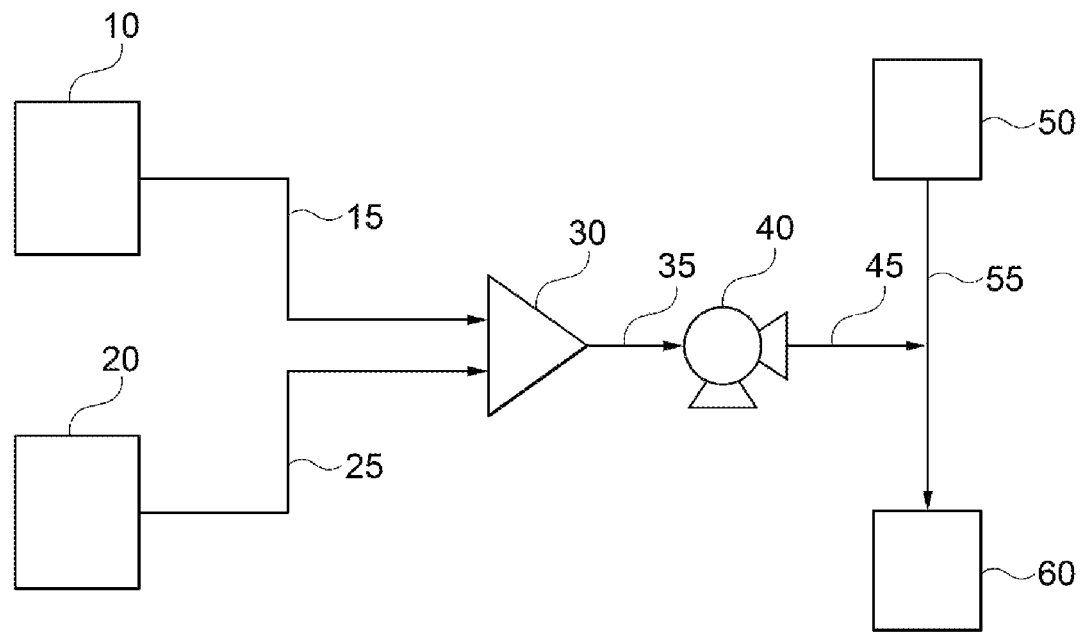
FIG. 1 is a schematic process flow diagram illustrating a method of producing an ethylene-carboxylic acid copolymer in accordance with exemplary embodiments.

FIG. 1 is a schematic process flow diagram illustrating a method of producing an ethylene-carboxylic acid copolymer in accordance with exemplary embodiments.

Referring to FIG. 1, a carboxylic acid monomer and a polar co-solvent may be supplied into an introduction unit. For example, the carboxylic acid monomer and the polar co-solvent may be supplied to a mixing unit 30 from a carboxylic acid monomer supply unit 10 and a co-solvent supply unit 20, respectively.

The carboxylic acid monomer may include an unsaturated carboxylic acid capable of inducing a chain polymerization reaction. In exemplary embodiments, (meth)acrylic acid or an ester thereof (e.g., (meth)acrylate) may be used as the carboxylic acid monomer. In the present application, the term "(meth)acrylic acid" is used to include both methacrylic acid and acrylic acid.

The polar co-solvent may be mixed with the carboxylic acid monomer and injected to a reactor, and may inhibit a crystallization and a self-polymerization of the carboxylic acid monomer.

For example, a crystallization temperature of a mixture of the polar co-solvent and the carboxylic acid monomer may be lower than a crystallization temperature of a pure carboxylic acid monomer. Accordingly, an allowable range of a process temperature capable of preventing the crystallization may be widened, thereby lowering an operating temperature of equipment without causing the crystallization and reducing the self-polymerization of the carboxylic acid monomer.

In exemplary embodiments, a polar organic solvent such as an alcohol-based solvent, an ether-based solvent, a ketone-based solvent, etc., may be used as the polar co-solvent. For example, ethanol, methanol, propanol, butanol, etc., may be used as the alcohol-based solvent.

In a preferable embodiment, ethanol, acetone and/or ethyl acetate may be used as the polar co-solvent.

In exemplary embodiments, water may be excluded from the polar co-solvent. If the water is used as the polar co-solvent, the self-polymerization of the carboxylic acid monomer may be rather accelerated. Thus, according to embodiments of the present invention, the above-described organic solvent-based polar co-solvent may be used so that the crystallization temperature may be reduced without accelerating the self-polymerization.

However, when the polar co-solvent is used, the polar co-solvent may react with the carboxylic acid monomer to produce by-products. For example, when acrylic acid is used as the carboxylic acid monomer and ethanol is used as the polar co-solvent, ethyl acrylate and water by an ester reaction may be produced as the by-products.

Further, when acrylic acid is used as the carboxylic acid monomer and ethyl acetate is used as the polar co-solvent, ethyl acrylate may be produced as the by-products by a trans-esterification.

Ethyl acrylate is a polymerizable material, and thus may cause a reduction of an acrylic acid content in a chain when preparing an ethyl-acrylic acid (EAA) copolymer. If ethyl acrylate participates in a polymerization instead of acrylic acid in the chain, an adhesion of a resulting copolymer product may be reduced, and a melting point may be lowered by inhibiting a crystal formation of the polymer due to a bulky structure. The low melting point may cause a blocking phenomenon occurring when a pellet-shaped polymer products are adhered to each other.

Ethyl acrylate may react with water when exposed to a high temperature to release ethanol by hydrolysis. Accordingly, when being included as by-products in the copolymer product, residues such as bubbles on a surface or at an inside of a processed product.

Further, ethyl acrylate is an odor-induced material, thereby causing malodor even when used in a small amount. When a large amount of ethyl acrylate is included as the by-product, the product may not be proper to be used as, e.g., a food packaging. Thus, when the ethylene-carboxylic acid copolymer is used as a food packaging material, a residual content of ethyl acrylate in the product is regulated to less than 6 ppm according to the EU food contact regulations.

Additionally, when being calculated assuming the case where a side reaction product remains at 6 ppm in a final product by a plant process simulation model in order to control the side reaction product in advance, an actual side reaction product in a discharge unit 40 is to be limited as a level of 600 ppm or less.

Further, when ethyl acrylate is generated by the ester reaction, water is also produced. As a result, dimerization and self-polymerization of the carboxylic acid monomer may be accelerated by water as described above.

To suppress or reduce the side effects caused by the above-described side reactions due to the use of the polar co-solvent, mixing and transfer properties of the carboxylic acid monomer and the polar co-solvent in the flow path through which the carboxylic acid monomer and the polar co-solvent are transported including, e.g., the mixing unit 30 and the discharge unit 40 may be adjusted according to exemplary embodiments as will be described below.

In the ethylene-carboxylic acid copolymer manufacturing process, it is not easy to estimate the generation of the side reaction products due to the co-solvent input through pilot/laboratory equipment. Actually, a residual amount of the side reaction product in the polymer could not be detected when evaluation of the side reaction product according to the introduction of ethanol was performed through a pilot/lab test for manufacturing the ethylene-carboxylic acid copolymer. However, it was confirmed that ethyl acrylate in the final product was detected at a significant level as a result of injecting the same molar ratio of ethanol as the co-solvent into an actual polymerization process.

Therefore, control and design of process variables to suppress the side reaction products without additional analysis equipment and reaction analysis results are required.

Accordingly, according to exemplary embodiments, a Reaction Progress Index (RPI), which will be described later, may be adjusted to suppress a side reaction between the carboxylic acid monomer and the polar co-solvent.

$$RPI = \frac{C_{solvent}}{C_{monomer}} tT \qquad \text{[Equation 1]}$$

In Equation 1, $C_{solvent}$ and $C_{monomer}$ represent initial molar concentrations of the carboxylic acid monomer and the polar co-solvent, respectively, in a flow path or a storage unit through which the carboxylic acid monomer and the polar co-solvent are mixed and introduced.

t represents a contact time between the carboxylic acid monomer and the polar co-solvent. For example, t may refer to a time from when the carboxylic acid monomer and the polar co-solvent are introduced together into the mixing unit 30 until being discharged from the discharge unit 40 to meet an ethylene stream 55.

T may represent an average contact temperature of the carboxylic acid monomer and the polar co-solvent. For example, T is an average temperature of an initial temperature when the carboxylic acid monomer and the polar co-solvent are mixed in the mixing unit 30 and a temperature raised by a pressurization before meeting the ethylene stream after being discharged from the discharge unit 40. For example, T is an arithmetic average of a temperature in the mixing unit 30 and a temperature in a discharge flow path 45, or an arithmetic average of a temperature in a storage tank 65 (see FIG. 2) and the temperature in a discharge flow path 80.

T and $$\frac{C_{solvent}}{C_{monomer}}$$

may be factors related to a side reaction rate by using the polar co-solvent. For example, when T and $$\frac{C_{solvent}}{C_{monomer}}$$

are each increased, the esterification reaction may be accelerated. t may be a factor related to a reaction time at which side reactions of the carboxylic acid monomer and the polar cosolvent may occur.

In exemplary embodiments, the RPI may be adjusted in a range from 1.5 to $1.3 \times 10^7$ sec·K. When the RPI is less than 1.5 sec·K, the effect of reducing the crystallization temperature by the polar co-solvent may not be sufficiently realized. If the RPI exceeds $1.3 \times 10^7$ sec·K, the esterification reaction may proceed excessively and the above-described side effects may occur, and may be beyond a regulatory range on the side reaction products, thereby to make a commercial product unavailable.

In a preferable embodiment, the RPI may be adjusted in a range from 14.9 to $1.3 \times 10^5$ sec·K.

Each of $$\frac{C_{solvent}}{C_{monomer}},$$

t and T may be adjusted to satisfy the above-described RPI range, and may not be limited to a specific range.

As described above, as described in Equation 1, the RPI in which a process factor affecting a reaction rate and a process time during which the reaction may proceed with the corresponding reaction rate are combined may be utilized as a process control variable in a process using various polar co-solvents. Therefore, a comprehensive side reaction control may be implemented without installing a separate analysis equipment for suppressing the side reactions of the carboxylic acid monomer and analyzing the reaction results.

Further, the amount of the side reaction products may be easily controlled at a desired level by adjusting the RPI. For example, as described with reference to FIGS. 3 to 11, a relationship between RPI and the side reaction product (e.g., ethyl acrylate) may be substantially linear. Therefore, the amount of the side reaction product may be finely controlled with high reliability through the adjustment of the RPI.

Referring to FIG. 1 again, the carboxylic acid monomer and the polar co-solvent may be separately and individually supplied from the carboxylic acid monomer supply unit 10 and the co-solvent supply unit 20, respectively to the mixing unit 30.

For example, the carboxylic acid monomer and the polar co-solvent may enter the mixing unit 30 separately through a first flow path 15 and a second flow path 25, respectively. Therefore, an esterification reaction may be suppressed by reducing the contact time between the carboxylic acid monomer and the polar co-solvent.

In some embodiments, one or more additive such as a polymerization initiator, a reaction inhibitor and an anti-oxidant may be supplied together to the mixing unit 30 or the storage tank 65.

The polymerization initiator may include an initiator known in the field of polymerization. For example, a peroxide or peroxy-based compound, an azobis-based compound, etc., may be used as the polymerization initiator.

The reaction inhibitor may be additionally included to suppress the side reaction of the carboxylic acid monomer and the polar co-solvent. For example, the reaction inhibitor may inhibit an ester formation through a competitive reaction with alcohol.

In some embodiments, an amine-based compound may be used as the reaction inhibitor. Examples of the amine-based compound may include an alkyl amine such as trimethyl amine.

In some embodiments, an input molar ratio of the reaction inhibitor relative to the carboxylic acid monomer may be from $10^{-6}$ to $10^{-3}$. Within the above range, esterification may be sufficiently suppressed without lowering a polymerization reaction efficiency.

The carboxylic acid monomer and the polar co-solvent mixed by the mixing unit 30 may move to the discharge unit 40 through a conveying flow path 35 and may be discharged through the discharge flow path 45 for the copolymerization with ethylene.

The discharge unit 40 may include, e.g., a discharge apparatus such as a pump or a compressor.

In exemplary embodiments, the temperature (e.g., the mixing temperature and the discharging temperature) in the mixing unit 30 and the discharge unit 40 may be higher than a crystallization temperature of the carboxylic acid monomer, and may be less than a temperature at which the self-polymerization of the carboxylic acid occurs.

For example, the temperature in the mixing unit 30 and the discharge unit 40 may each be adjusted within a range from 20 to 100° C.

In exemplary embodiments, a discharge pressure (e.g., a discharge pressure from the discharge unit 40) of the carboxylic acid monomer and the polar co-solvent may be greater than an inlet pressure or a mixing pressure in the mixing unit 30.

In some embodiments, the discharge pressure may be greater than a copolymerization reaction pressure in the reactor 60.

For example, the discharge pressure may be maintained in a range from 1,100 to 2,500 bar. Preferably, the discharge pressure may be in a range from 1,300 to 2,300 bar.

Ethylene may be transferred through a third flow path 55 to be in contact with a mixture of the carboxylic acid monomer and the polar co-solvent supplied through the discharge flow path 45. Thereafter, a copolymerization of the carboxylic acid monomer and ethylene may be performed in the reactor 60 to produce an ethylene-carboxylic acid copolymer (e.g., an EAA copolymer).

In some embodiments, the above-described polymerization initiator may be introduced together into the reactor 60 through the third flow path 55 or through a separate flow path.

In an embodiment, the polymerization initiator may not be introduced into the mixing unit 30, and may be introduced only into the reactor 60. Accordingly, the self-polymerization of the carboxylic acid monomer may be prevented from being promoted in advance by the polymerization initiator.

In some embodiments, a chain transfer agent may be introduced during the polymerization process through, e.g., the third flow path 55. A molecular weight and molecular weight distribution of a polymer product may be easily controlled in a desired range using the chain transfer agent.

The polar co-solvent may also have a chain transfer effect on the polymerization of an ethylene-carboxylic acid comonomer. Therefore, an input amount of the chain transfer agent and the polar co-solvent may be controlled in consideration of a chain transfer coefficient (Cs) of the polar co-solvent, so that the molecular weight and molecular weight distribution of the ethylene-carboxylic acid copolymer may be effectively controlled while implementing the effect of injecting the polar co-solvent.

The chain transfer agent may include, e.g., a non-polar organic compound such as isobutane or propane, or a polar organic compound such as methyl ethyl ketone, isopropylaldehyde or vinyl acetate.

In some embodiments, the polar co-solvent may also interact with the chain transfer agent at an inside of the reactor to affect a molecular weight control.

In some embodiments, an input concentration ($C_{solvent}$) of the polar co-solvent in the reaction progress index may be adjusted by comprehensively considering concentrations of the polar co-solvent and the chain transfer agent at a front-end flow path of the reactor (e.g., the third flow path 55), and each chain transfer coefficient thereof to satisfy a range represented by Equation 2 below.

$$0.003 \text{ mol/L} \leq Cs_{solvent}C_{solvent}^r + Cs_{CTA}C_{CT}^r \leq 0.01 \text{ mol/L} \quad \text{[Equation 2]}$$

$C_{solvent}^r$ and $C_{CTA}^r$ are each molar ratio of the polar co-solvent and the chain transfer agent (CTA), respectively, at the front-end flow path of the reactor. $Cs_{solvent}$ and $Cs_{CTA}$ are each chain transfer coefficient (Cs value) of the polar co-solvent and the chain transfer agent (CTA), respectively, with respect to ethylene at 200° C.

The chain transfer coefficient is a constant indicating a reactivity of the chain transfer agent that terminates a polymerization reaction. As the chain transfer coefficient value becomes greater, an amount of the chain transfer agent required to reduce a molecular weight of the polymer during the polymerization process becomes small.

Specific values of the chain transfer coefficient are given in documents such as Polymer Science & Technology, Joel R. Fried, 2006, 2nd ed., pp. 34~39, Handbook of polymer synthesis part A, Hans R. Kricheldorf, 1991, pp. 3-5, Polymer science and engineering, David J. Williams, pp. 103-104 et al., etc.

For example, at an outside of the range of the chain transfer-related numerical value expressed in Equation 2, chain termination may be excessively activated or chain extension may be excessively advanced to interfere with the molecular weight control.

In exemplary embodiments, $C_{solvent}^r$ and $C_{CTA}^r$ may be adjusted to satisfy the range of Equation 2 in consideration of $Cs_{solvent}$ and $Cs_{CTA}$ so that an influence of the polar co-solvent to the molecular weight and the molecular weight distribution of the polymer product may be controlled. For example, a concentration of the polar co-solvent in an injection unit in Equation 1 ($C_{solvent}$) may be controlled to satisfy $C_{solvent}^r$ of Equation 2.

As illustrated in FIG. 1, the mixture of the carboxylic acid monomer and the polar co-solvent may be mixed with ethylene before being injected into the reactor 60 to improve polymerization efficiency in the reactor 60. In an embodiment, the mixture of the carboxylic acid monomer and the polar co-solvent, and ethylene may be injected together into the reactor 60.

For example, a polymerization temperature in the reactor 60 may be 170 to 270° C. A pressure in the reactor 60 may be 1,100 to 2,500 bar.

In exemplary embodiments, a content of ethylene (e.g., a content of ethylene-derived units or blocks) in a total weight of the ethylene-carboxylic acid copolymer may be from 60 to 98 wt % and a content of the carboxylic acid (e.g., a content of carboxylic acid-derived units or blocks) may be from 2 to 40 wt %. Within the above range, a decrease in purity due to the self-polymerization of the carboxylic acid monomer and the ester by-product may be sufficiently prevented. In a preferable embodiment, the ethylene content may be from 75 to 97.5 wt % and the carboxylic acid content (e.g., the content of carboxylic acid-derived units or blocks) may be from 2.5 to 25 wt %.

For example, a weight average molecular weight of the copolymer produced from the reactor 60 may be 8,000 to 1,000,000.

According to the above-described exemplary embodiments, crystallization and self-polymerization of the carboxylic acid monomer may be reduced while suppressing side reactions by controlling reaction kinetic properties between the carboxylic acid monomer and the polar co-solvent. Therefore, the above-mentioned side effects due to by-products such as ethyl acrylate may be prevented or reduced while improving yield and purity of the ethylene-carboxylic acid copolymer.

The above-described ethylene-carboxylic acid copolymer may be commercialized in the form of, e.g., pellets and used for applications such as an adhesive film, a sealing material, an insulating coating layer, a packaging film, or the like.

Figure 2:
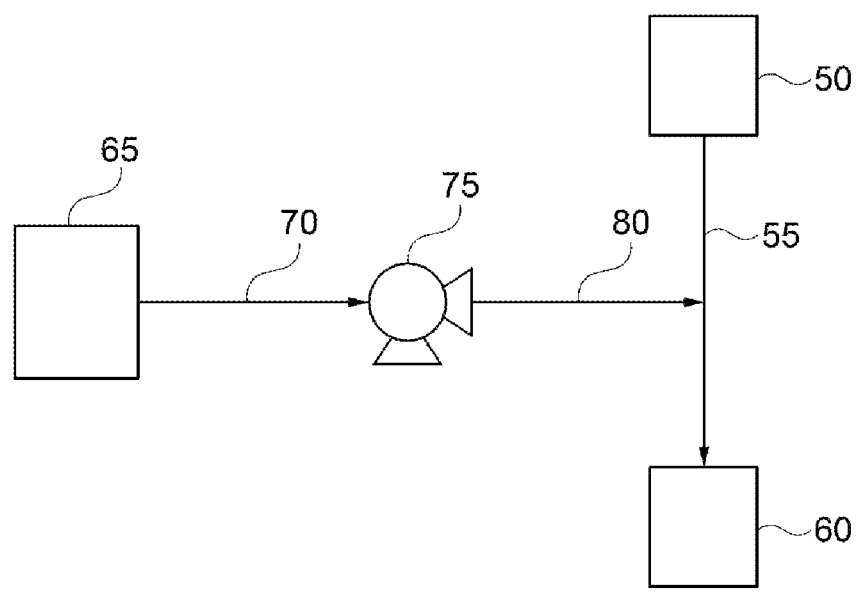
FIG. 2 is a schematic process flow diagram illustrating a method of producing an ethylene-carboxylic acid copolymer in accordance with some exemplary embodiments.
Figure 3:
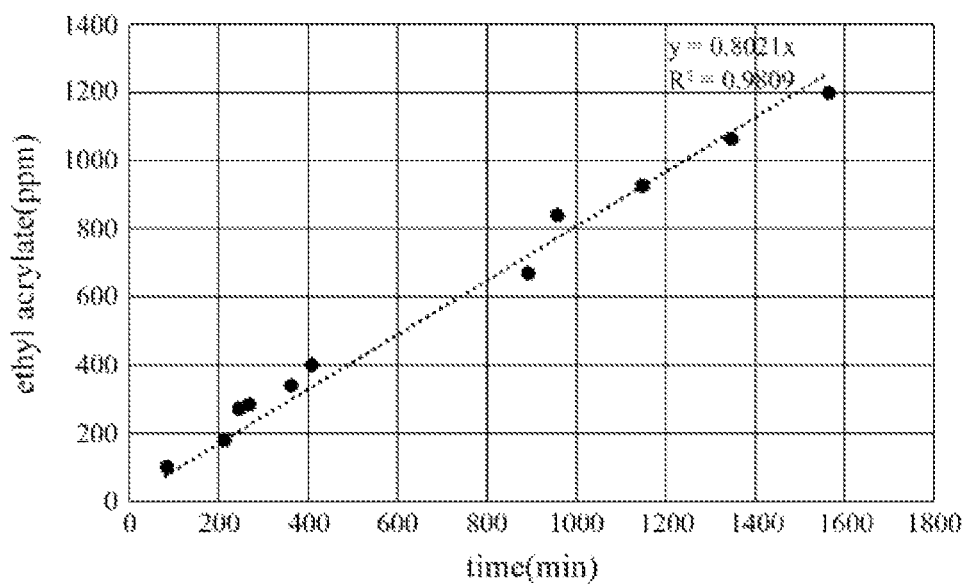
FIGS. 3 to 11 are graphs showing amounts of ethyl acrylate generated over time.
Figure 4:
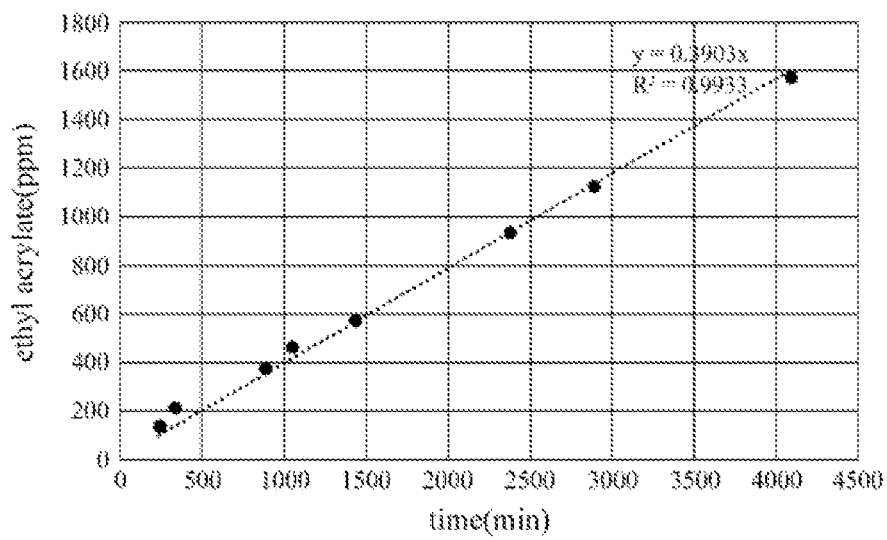
Figure 5:
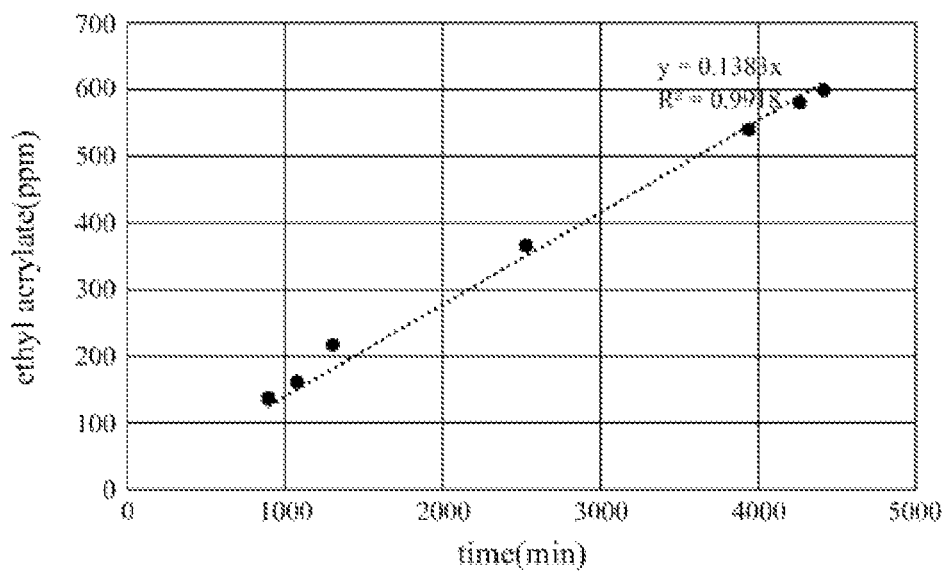
Figure 6:
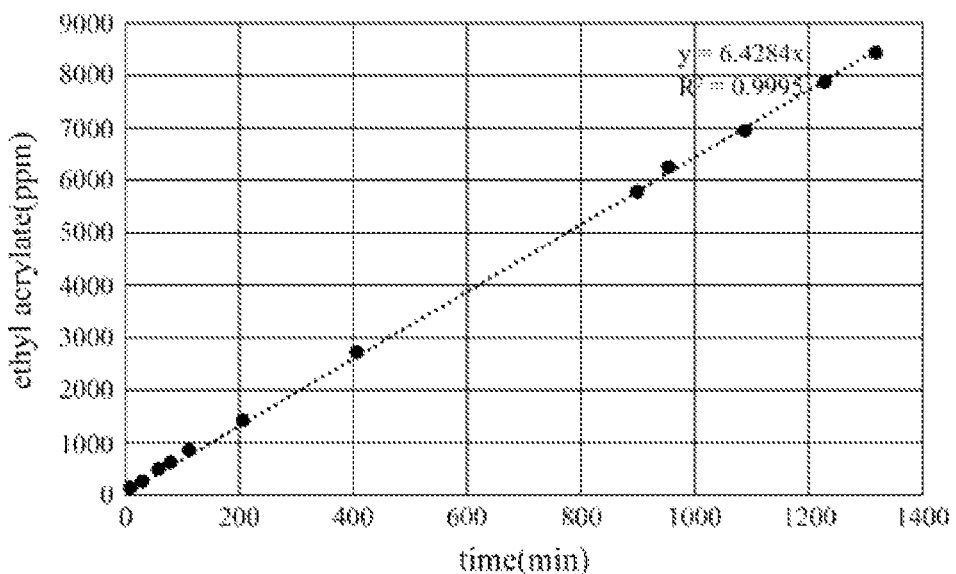
Figure 7:
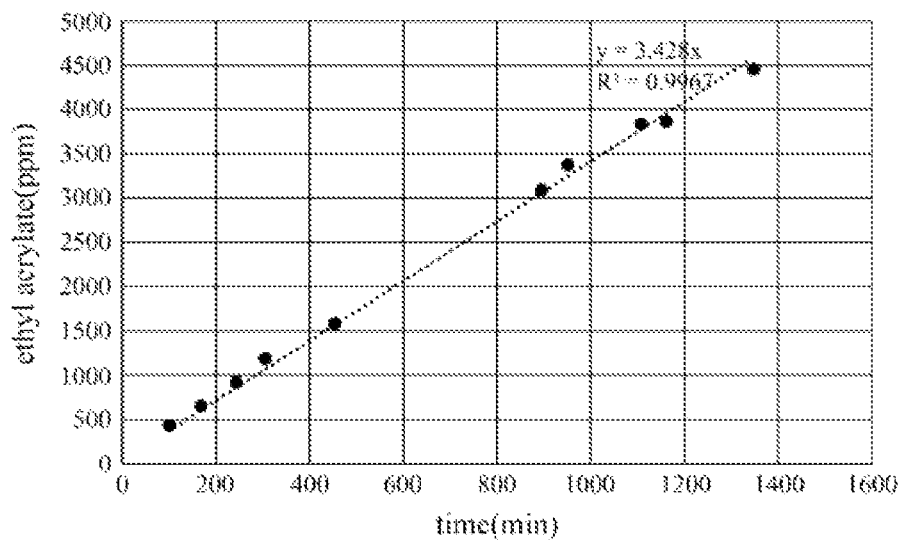
Figure 8:
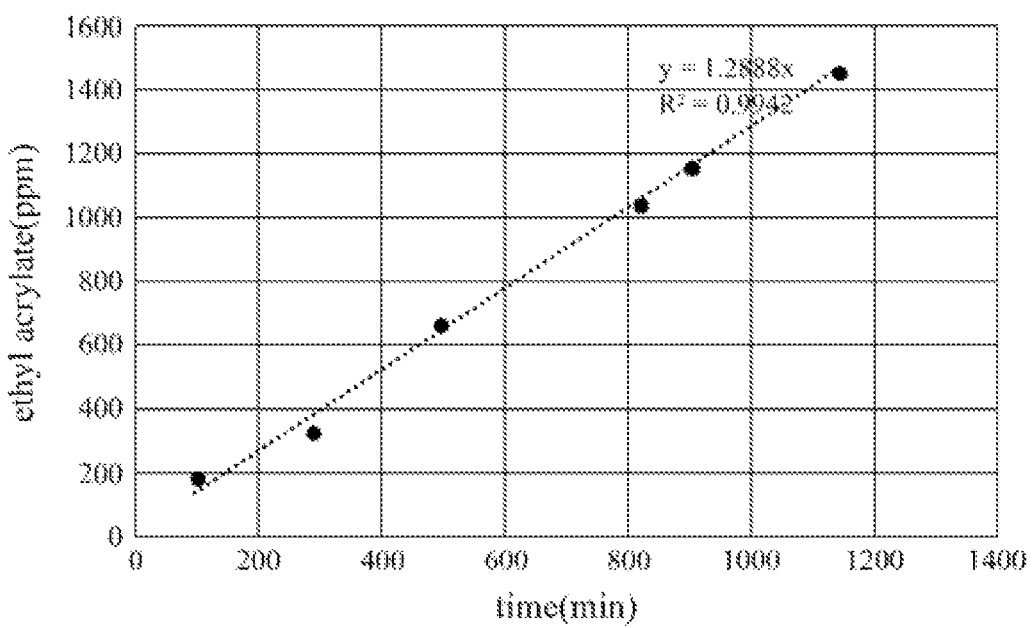
Figure 9:
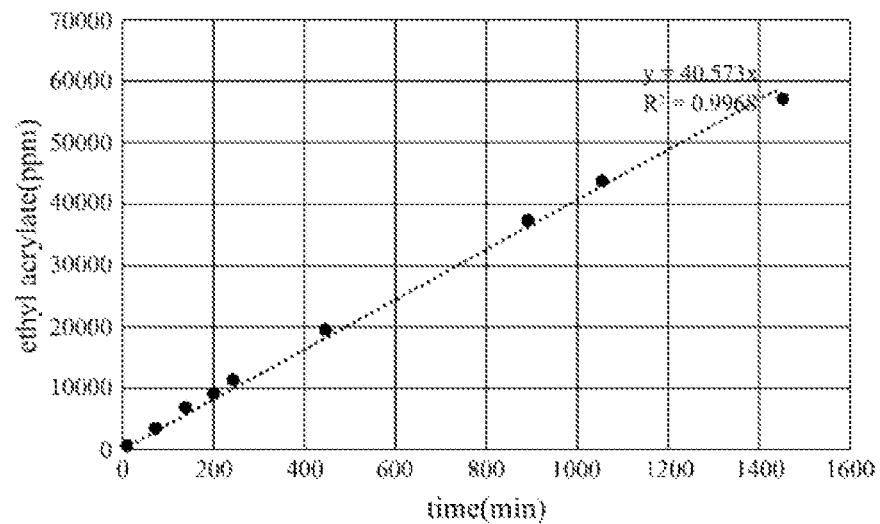
Figure 10:
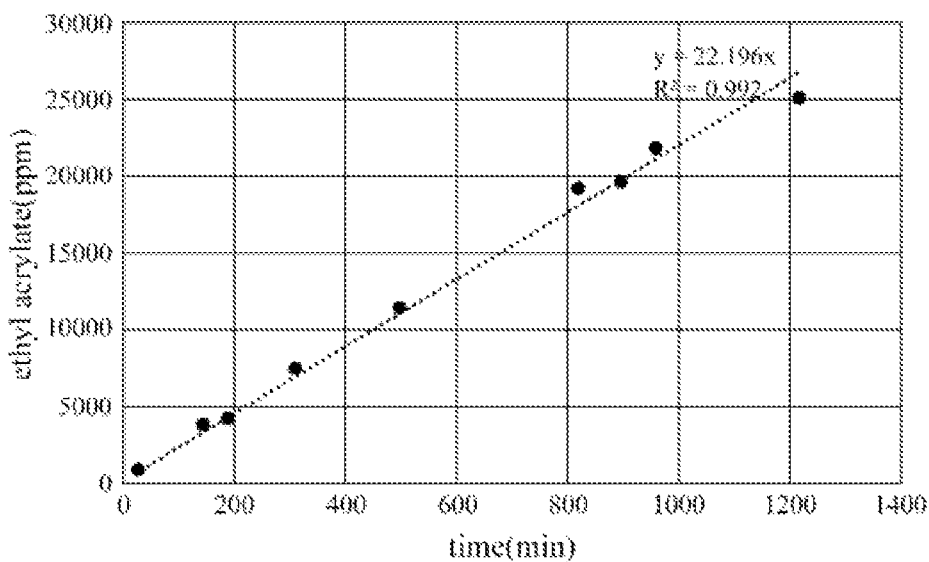
Figure 11:
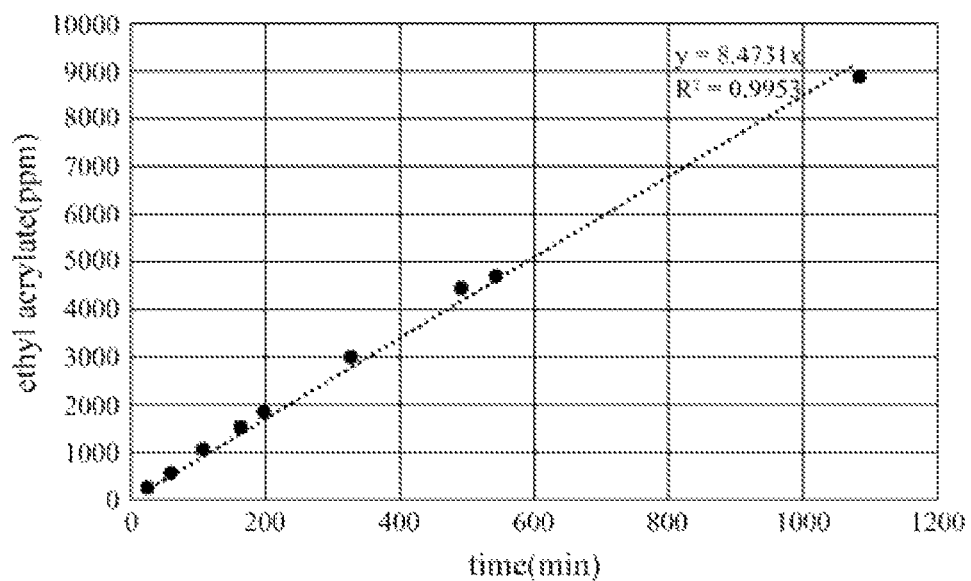

FIG. 2 is a schematic process flow diagram illustrating a method of producing an ethylene-carboxylic acid copolymer in accordance with some exemplary embodiments.

Referring to FIG. 2, the carboxylic acid monomer and the polar co-solvent may be stored and supplied together in the storage tank 65. For example, the mixture of the carboxylic acid monomer and the polar co-solvent from the storage tank 65 may be transferred to a discharge unit 75 through a transfer flow path 70. The mixture may be discharged from the discharge unit 75 through a discharge flow path 80.

Ethylene stored in an ethylene supply unit 50 may flow through a third flow path 55 and may be in contact with the mixture of the carboxylic acid monomer and the polar co-solvent supplied through the discharge flow path 80. Thereafter, copolymerization of the carboxylic acid monomer and ethylene may be performed in the reactor 60 to prepare an ethylene-carboxylic acid copolymer (e.g., EAA copolymer).

In the embodiment of FIG. 2, a process may be designed and performed to satisfy the RPI range according to the above-described exemplary embodiments. For example, t in Equation 1 may represent a contact time of the carboxylic acid monomer and the polar co-solvent after introduction into the storage tank 65 until the contact with ethylene.

In some embodiments, the chain transfer agent may be supplied to satisfy Equation 2 through the third flow path 55.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example 1

To simulate a generation of side reaction products by contact between a carboxylic acid monomer and a polar co-solvent, an amount of ethyl acrylate generated in a mixture of acrylic acid (AA) (containing 200 ppm MEHQ (mono methyl ether hydroquinone) as an inhibitor, 99.5% purity, Alfa Aeser) and ethanol (EtOH) (99.5% Purity, Sigma-Aldrich) was measured using gas chromatography-flame ionization detector (GC-FID) by taking samples over time and adding an internal standard material In Experimental Examples 1-1 to 1-9, EtOH/AA mixing ratios and contact temperatures were adjusted as described in Table 1.

FIGS. 3 to 11 are graphs showing amounts of ethyl acrylate generated over time.

Referring to FIGS. 3 to 11, a tendency of ethyl acrylate being linearly generated with time was observed. Relationships between the ethyl acrylate generation amount (y) according to time (x) derived from a linear regression analysis were shown in FIGS. 3 to 11.

Specifically, as an EtOH/AA molar ratio becomes greater under the same temperature condition and a reaction temperature becomes greater at the same EtOH/AA molar ratio, the generation of ethyl acrylate was promoted.

It is necessary to obtain a process operation range capable of preventing self-polymerization and crystallization of the carboxylic acid monomer by lowering a crystallization temperature of the mixture in the discharge unit 40 through the introduction of the polar co-solvent. Thus, to properly mix the carboxylic acid monomer and the polar co-solvent and supply the mixture into the reactor, a minimum contact time (or a residence time) of the mixture was set to 0.1 second.

As described above, an allowable level of ethyl acrylate in the discharge unit 40 in a plant process simulation model to satisfy the regulatory standard of 6 ppm of the side reaction product (ethyl acrylate) in the final product was set to 600 ppm.

The reaction progress index (RPI) (a lower limit) according to the minimum contact time of 0.1 second for each Experiment Example and the RPI (an upper limit) at the contact time corresponding to 600 ppm that is the upper limit of ethyl acrylate generation, was calculated and shown in Table 1.

TABLE 1

| | Molar ratio of reactant | | Reaction Temperature (° C.) | Reaction Progress Index (RPI) (sec · K) | |
|---|---|---|---|---|---|
| | Acrylic Acid (AA) | Polar Co-solvent (EtOH) | | lower limit (contact time 0.1 sec) | upper limit |
| Experimental Example 1-1 | 1 | 1 | 25 | 29.8 | 1.3E+07 |
| Experimental Example 1-2 | 6 | 1 | 25 | 5.0 | 4.6E+06 |
| Experimental Example 1-3 | 20 | 1 | 25 | 1.5 | 3.9E+06 |
| Experimental Example 1-4 | 1 | 1 | 50 | 32.3 | 1.8E+06 |
| Experimental Example 1-5 | 6 | 1 | 50 | 5.4 | 5.7E+05 |
| Experimental Example 1-6 | 20 | 1 | 50 | 1.6 | 4.5E+05 |
| Experimental Example 1-7 | 1 | 1 | 75 | 34.8 | 3.1E+05 |
| Experimental Example 1-8 | 6 | 1 | 75 | 5.8 | 9.4E+04 |
| Experimental Example 1-9 | 20 | 1 | 75 | 1.7 | 7.4E+04 |

Referring to Table 1, when the RPI was adjusted between 1.5 and $1.3 \times 10^7$ sec·K, the amount of the side reaction product (ethyl acrylate) was easily managed below the target value while obtaining a wide process operation range through the introduction of a polar co-solvent. When the RPI is less than 1.5, the polar co-solvent cannot be effectively introduced into the reactor substantially. When the RPI exceeds $1.3 \times 10^7$ sec·K, the manageable regulatory range of ethyl acrylate may be exceeded in the final product and may cause the side effects as described above.

Additionally, the RPI (a lower limit) with the minimum contact time set to 1 second in order to obtain a sufficient process operation range through the polar co-solvent and the RPI (an upper limit) at a contact time to satisfy the actual ethyl acrylate regulation standard of 6 ppm were calculated as shown in Table 2. Specifically, the contact time corresponding to 6 ppm was calculated through the relational expression of the ethyl acrylate generation amount (y) according to time (x) as shown in FIGS. 3 to 11.

TABLE 2

| | Molar ratio of reactant | | Reaction Temperature (° C.) | Reaction Progress Index (RPI) (sec · K) | |
|---|---|---|---|---|---|
| | Acrylic Acid (AA) | Polar Co-solvent (EtOH) | | lower limit (contact time 1 sec) | upper limit (ethyl acrylate 6 ppm) |
| Experimental Example 1-1 | 1 | 1 | 25 | 298 | 1.3E+05 |
| Experimental Example 1-2 | 6 | 1 | 25 | 49.7 | 4.6E+04 |
| Experimental Example 1-3 | 20 | 1 | 25 | 14.9 | 3.9E+04 |
| Experimental Example 1-4 | 1 | 1 | 50 | 323 | 1.8E+05 |
| Experimental Example 1-5 | 6 | 1 | 50 | 53.8 | 5.7E+03 |
| Experimental Example 1-6 | 20 | 1 | 50 | 16.2 | 4.5E+03 |
| Experimental Example 1-7 | 1 | 1 | 75 | 348 | 3.1E+03 |
| Experimental Example 1-8 | 6 | 1 | 75 | 58 | 9.4E+02 |
| Experimental Example 1-9 | 20 | 1 | 75 | 17.4 | 7.4E+02 |

Referring to Table 2, when the RPI was adjusted between 14.9 and $1.3 \times 10^5$ sec·K, the amount of side reaction products was suppressed to be less than the actual standard while realistically increasing the contact time of the polar co-solvent.

Experimental Example 2

Molar concentrations of the chain transfer agent and the polar co-solvent at a front-end flow path of the reactor 60 were measured by a process simulation model of the polymerization process of the ethylene-acrylic acid copolymer, and the above-mentioned Equation 2 values were calculated therefrom.

TABLE 3

|  | Polar Co-solvent | | | Chain Transfer Agent (CTA) | | | Equation 2 value |
| --- | --- | --- | --- | --- | --- | --- | --- |
|  | solvent | [C] (mol/L) | Cs value | Agent | [C] (mol/L) | Cs value |  |
| Experimental Example 2-1 |  |  |  | isobutane | 0.3067 | 0.0136 | 0.004 |
| Experimental Example 2-2 |  |  |  | MEK | 0.0614 | 0.0750 | 0.005 |
| Experimental Example 2-3 | ethanol | 0.2982 | 0.0135 | isobutane | 0.3016 | 0.0136 | 0.008 |
| Experimental Example 2-4 | ethanol | 0.4731 | 0.0135 | isobutane | 0.1754 | 0.0136 | 0.009 |

As described above, the molecular weight and molecular weight distribution of the copolymer may be appropriately adjusted within the numerical range of Equation 2. Additionally, an influence on the molecular weight distribution by the use of the polar co-solvent may be appropriately controlled within the numerical range of Equation 2.

For example, when the numerical value of Equation 2 is less than a lower limit (0.003 mol/L), a total amount of a compound having a chain transfer activity in the reactor may be insufficient, and an average molecular weight of the product may become excessively large or the molecular weight distribution may become excessively wide. When the numerical value of Equation 2 becomes larger than an upper limit (0.01 mol/L), the total amount of the compound having the chain transfer activity in the reactor increases, and the average molecular weight of the product may become excessively small or the molecular weight distribution may become excessively narrow.

Referring to Table 3, it can be confirmed that the calculated value of Equation 2 can be maintained within the range of Equation 2 by reducing a content of the chain transfer agent through an inherent chain transfer action of the polar co-solvent even when the polar co-solvent is newly introduced.

What is claimed is:

1. A method of producing an ethylene-carboxylic acid copolymer, comprising:

forming a mixture of a carboxylic acid monomer and a polar co-solvent that is an organic solvent; and injecting the mixture and ethylene into a reactor to copolymerize the mixture and ethylene, wherein the forming the mixture of the carboxylic acid monomer and the polar co-solvent includes adjusting a Reaction Progress Index (RPI) defined by Equation 1 in a range from 1.5 to $1.3 \times 10^7$ sec·K to control an amount of a side reaction product of the carboxylic acid monomer and the polar co-solvent:

$$RPI = \frac{C_{solvent}}{C_{monomer}} tT \quad \text{[Equation 1]}$$

wherein, in Equation 1, $C_{solvent}$ and $C_{monomer}$ are initial molar concentrations of the carboxylic acid monomer and the polar co-solvent, respectively, t represents a contact time of the carboxylic acid monomer and the polar co-solvent, and T represents an average contact temperature of the carboxylic acid monomer and the polar co-solvent before being reacted with ethylene.

2. The method according to claim 1, wherein the reaction progress index is in a range from 14.9 to $1.3 \times 10^5$ sec·K.

3. The method according to claim 1, further comprising discharging the mixture.

4. The method according to claim 3, wherein a discharge pressure of the mixture is greater than a mixing pressure of the carboxylic acid monomer and the polar co-solvent.

5. The method according to claim 4, wherein the discharge pressure is greater than a pressure in the reactor.

6. The method according to claim 3, wherein the forming the mixture comprises introducing each of the carboxylic acid monomer and the polar co-solvent into a mixing unit, wherein the discharging the mixture comprises:

transferring the mixture from the mixing unit to a discharge unit through a conveying flow path; and discharging the mixture from the discharge unit through a discharge flow path.

7. The method according to claim 1, wherein a temperature of the mixture is maintained to be greater than a crystallization temperature of the carboxylic acid monomer and less than a self-polymerization temperature of the carboxylic acid monomer.

8. The method according to claim 1, wherein the mixture is in contact with ethylene before being injected into the reactor.

9. The method according to claim 1, further comprising injecting a reaction inhibitor between the carboxylic acid monomer and the polar co-solvent into the mixture.

10. The method according to claim 9, wherein the reaction inhibitor includes an amine-based compound.

11. The method according to claim 1, further comprising injecting a chain transfer agent into the mixture through a front-end flow path of the reactor.

12. The method according to claim 11, wherein the chain transfer agent includes a non-polar organic compound.

13. The method according to claim 12, wherein the chain transfer agent includes methyl ethyl ketone or isobutane.

14. The method according to claim 11, wherein Equation 2 is satisfied:

$$0.003 \text{ mol/L} \leq Cs_{solvent} C_{solvent}^r + Cs_{CTA} C_{CTA}^r \leq 0.01 \text{ mol/L} \quad \text{[Equation 2]}$$

wherein $C_{solvent}^r$ and $C_{CTA}^r$ are each molar ratio of the polar co-solvent and the chain transfer agent (CTA), respectively, at the front-end flow path of the reactor, and $Cs_{solvent}$ and $Cs_{CTA}$ are each chain transfer coefficient (Cs) of the polar co-solvent and the chain transfer agent, respectively, with respect to ethylene at 200° C.

15. The method according to claim 1, wherein the carboxylic acid monomer includes acrylic acid and the polar co-solvent includes ethanol.

\* \* \* \* \*